(12) United States Patent
Sershon et al.

(10) Patent No.: US 11,344,048 B2
(45) Date of Patent: May 31, 2022

(54) NUTRIENT DENSE STABILIZER-FREE NON-DAIRY PLANT BASED FOOD PRODUCTS

(71) Applicant: The Quaker Oats Company, Chicago, IL (US)

(72) Inventors: Valerie C. Sershon, Schaumburg, IL (US); Michael D. McDonagh, Little Island (IE); Stephen P. Anderson, Barrington, IL (US); Suja Senan, Palatine, IL (US)

(73) Assignee: The Quaker Oats Company, Chicago, IL (US)

( * ) Notice: Subject to any disclaimer, the term of this patent is extended or adjusted under 35 U.S.C. 154(b) by 174 days.

(21) Appl. No.: 16/739,648

(22) Filed: Jan. 10, 2020

(65) Prior Publication Data
US 2021/0212348 A1    Jul. 15, 2021

(51) Int. Cl.
| | | |
|---|---|---|
| *A23L 7/104* | (2016.01) | |
| *A23L 33/22* | (2016.01) | |
| *A23L 7/10* | (2016.01) | |
| *A23L 29/30* | (2016.01) | |
| *A23L 33/115* | (2016.01) | |
| *A23L 33/185* | (2016.01) | |
| *A23L 3/10* | (2006.01) | |

(52) U.S. Cl.
CPC ............... *A23L 7/104* (2016.08); *A23L 3/10* (2013.01); *A23L 7/115* (2016.08); *A23L 29/35* (2016.08); *A23L 33/115* (2016.08); *A23L 33/185* (2016.08); *A23L 33/22* (2016.08); *A23V 2002/00* (2013.01); *A23Y 2220/15* (2013.01); *A23Y 2220/29* (2013.01); *A23Y 2240/75* (2013.01)

(58) Field of Classification Search
CPC .......... A23L 7/104; A23L 33/22; A23L 7/115; A23L 29/35; A23L 33/115; A23L 33/185; A23L 3/10; A23V 2002/00; A23Y 2220/15; A23Y 2220/29; A23Y 2240/75
USPC ........................................................ 426/18
See application file for complete search history.

(56) References Cited

U.S. PATENT DOCUMENTS

| | | |
|---|---|---|
| 4,073,948 A | 2/1978 | Chandler et al. |
| 4,497,840 A | 2/1985 | Gould et al. |
| 6,458,402 B1 | 10/2002 | Chang |
| 7,160,564 B2 * | 1/2007 | Triantafyllou ......... A23C 11/10 426/52 |
| 8,574,644 B2 | 11/2013 | Chatel et al. |
| 9,011,947 B2 * | 4/2015 | Carder .................... A23L 7/107 426/28 |
| 9,622,500 B2 | 4/2017 | Carder et al. |
| 10,143,226 B1 * | 12/2018 | Foster .................... A23L 33/19 |
| 2016/0198754 A1 | 7/2016 | Carder et al. |
| 2016/0213035 A1 | 7/2016 | De Ruiter et al. |
| 2017/0055550 A1 | 3/2017 | Brijwani et al. |
| 2017/0273337 A1 | 9/2017 | Brijwani et al. |
| 2018/0327792 A1 | 11/2018 | Brown et al. |
| 2019/0246678 A1 | 8/2019 | Boileau et al. |
| 2019/0274324 A1 | 9/2019 | Geoffrey et al. |

FOREIGN PATENT DOCUMENTS

WO    2017171601    10/2017

OTHER PUBLICATIONS

Figuerola, F. et al. Food Chem. 91: 395-401 (Year: 2005).*
CN 102429081—English Abstract (Year: 2013).*
Cargill Sell Sheet—Puris Pea Protein, 2019.
Lee et al., "Formation and Physical Properties of Yogurt," Aisan-Aust. J. Anim. Sci., vol. 23, No. 9 (1127-1136), 2010.
Leroy et al., "Lactic Acid Bacteria as Functional Starter Cultures for the Food Fermentation Industry," Trends in Food Science Technology, vol. 15 (67-78), 2004.
Axiom Foods, World of Plant-Based Proteins and More—Brochure.
Anonymous, "Spiced Pear & Fig Oatmilk Yogurt Alternative," Aug. 27, 2019.
Anonymous, "Fruit Flavoured Almond Drink," Sep. 19, 2019.
Anonymous, "Organic Plain Quinoa Drink," Feb. 8, 2019.
Anonymous, "BioVegan Dessert with Forest Berries," Dec. 28, 2018.
Amparo et al., "Fiber from Fruit Pomace: A review of Applications in Cereal-Based Products," Food Review International, vol. 34, No. 2, pp. 162-181, Dec. 23, 2016.
Angelov et al., "Oats as a Matrix of Choice for Developing Fermented Functional Beverages," Journal of Food Science and Technology, Springer (India) Private Ltd, India, vol. 55, No. 7, Apr. 28, 2018.
International Search Report and Written Opinion dated Apr. 7, 2021 in PCT/US2020/059180.

* cited by examiner

*Primary Examiner* — Hamid R Badr (74) *Attorney, Agent, or Firm* — Barnes & Thornburg LLP; G. Peter Nichols (57) ABSTRACT

A nutrient dense non-dairy food product includes water, a highly dispersible whole grain ingredient, a protein, a fiber, and a fat such that the product is free of exogenous stabilizers. The food product may also contain a fermentation agent.

21 Claims, 2 Drawing Sheets

NUTRIENT DENSE STABILIZER-FREE NON-DAIRY PLANT BASED FOOD PRODUCTS

The present disclosure relates to nutrient dense non-dairy food products.

BACKGROUND

Consumers are actively seeking dairy-alternative plant-based products such as fermented yogurts and drinkables that are nutrient dense, label transparent, possess few and simple-to-understand ingredients while still delivering sought-after flavor and texture attributes. Plant-based spoonables such as dairy-alternative (non-dairy) yogurts and drinkable products currently in the market rely heavily on the addition of stabilizers and/or gums to deliver sought-after texture and mouthfeel.

In addition, many of these products are not rich in nutrient density, lack one or more of the following, whole grains, complete protein, flavor, or are high in fat and sugar. Attempts to increase the nutrients in such products to provide nutrient dense products present processing challenges dues to the viscosity of the starting base, which if not addressed or solved will require the use of nonstandard processing equipment, thus increasing the overall cost to produce such products.

Another challenge with producing dairy alternatives is emulating the mouth feel and taste profile of dairy beverages and products. For example, alternatives such as soy milk, almond milk, and cashew milk can differ from dairy milk with respect to viscosity and settling of insoluble solids. The inventors have discovered how to tailor these and other attributes in whole oat grain non-dairy products with desired organoleptic properties and desired health-related benefits. Moreover, the inventors have developed methods of making non-dairy products that include whole grain oats such that the "whole grain" status of the oats can be maintained in the non-dairy products while providing desired organoleptic properties.

With respect to potentially desirable health attributes, it may be desirable to prepare a whole oat product that has sufficient soluble fiber to meet the FDA threshold necessary to justify a health claim. For example, a whole oat or barley product must have 0.75 g soluble beta-glucan fiber per serving of food to support a health claim under the most recent effective version of 21 C.F.R. 101.81, which is incorporated herein by reference as an example.

The term "nutrient dense" refers to products that are high in nutrients such as vitamins, minerals, complex carbohydrates, protein, and healthy fats but are still relatively low in calories.

The term "complete protein", is used to denote that the product containing proteins provides a score of 1 in the Protein digestibility-corrected amino acid score (PDCAAS). Using the PDCAAS method, the protein quality rankings are determined by comparing the amino acid profile of the specific food protein against a standard amino acid profile with the highest possible score being a 1.0. This score means, after digestion of the protein, it provides per unit of protein 100% or more of the indispensable amino acids required. The formula for calculating the PDCAAS percentage is: (mg of limiting amino acid in 1 g of test protein/mg of same amino acid in 1 g of reference protein)×fecal true digestibility percentage.

The term "non-dairy" refers to a product that is free of dairy.

All percentages described below are by weight unless explicitly noted otherwise.

SUMMARY

According to one aspect of the disclosure, a nutrient dense non-dairy product includes whole grain ingredient, protein, a mono- or disaccharide, fiber, fat, and water such that the product is free of exogenous stabilizers. Exogenous stabilizers refers to stabilizers that are added to the product as compared to compounds that that are naturally present in those ingredients forming the non-dairy product, which are considered to be intrinsic stabilizers. Advantageously, it has been found that the combination of the whole grain ingredient and the fat are the predominant determinants of the resulting texture of the end product.

In some aspects, it has advantageously been found that certain fiber ingredients such as inulin may provide a prebiotic effect, i.e., may induce the growth or activity of beneficial microorganisms such as bacteria and fungi. The most common example is in the gastrointestinal tract, where prebiotics can alter the composition of organisms in the gut microbiome. Certain prebiotics are typically nondigestible fiber compounds that pass undigested through the upper part of the gastrointestinal tract and stimulate the growth or activity of advantageous bacteria that colonize the large bowel by acting as a substrate for them.

In some embodiments, the composition may be a beverage; for example, the beverage may have the thickness of a smoothie or milkshake. It is also contemplated that the beverage may be fermented.

In other embodiments, the composition may be a spoonable product such as a yogurt-type product. To provide a yogurt-type product, the nutrient dense non-dairy product includes a fermentation agent to ferment the mono- and disaccharides present in the product to produce organic acids such as, but not limited to, lactic acid. The production of organic acids results in a decrease in the pH and an increase in the viscosity due to protein denaturation.

The whole grain ingredient may be a whole grain flour, a bran concentrate, or mixture of both. In some instances, the whole grain ingredient is highly dispersible and may be a highly dispersible whole grain flour. It may be desirable to provide the highly dispersible whole grain flour by at least partially hydrolyzing starch in a starting whole grain to provide a partially hydrolyzed whole grain ingredient where the starting whole grain has a pre-hydrolysis starch-to-protein mass ratio and the hydrolyzed whole grain has a post-hydrolysis starch-to-protein mass ratio, such that the post-hydrolysis starch-to-protein mass ratio is equal to the pre-hydrolysis starch-to-protein mass ratio within a tolerance of ±10% of the pre-hydrolysis starch-to-protein mass ratio.

The bran concentrate may be a soluble bran concentrate. A soluble bran concentrate is typically produced using a combination of mechanical processing and enzymatic treatment. For example, whole oat groats (de-hulled) are processed through sequential milling and separation steps to generate oat bran concentrate, which is further processed through extrusion, optional enzymatic addition and drying. The result is a powdered ingredient rich in soluble beta-glucan that keeps intact the molecular structure and therefore its functional properties, but also exhibits a reduced viscosity, which makes it desirable for drinkable products.

In some instances, the protein is provided by a vegetable source such as a vegetable protein isolate. In this regard, suitable vegetables may be, but are not limited to, pea, potato, *faba* bean, chickpea, lentil, and combinations thereof. The protein isolates may be obtained from these proteins.

The fiber may be provided from an endogenous source, an exogenous source, or a combination thereof. An endogenous source may include the whole grain material. In some instances, the endogenous source of fiber includes a vegetable or fruit pomace, particularly a fruit pomace. In some embodiments, the endogenous fiber is a fruit pomace that has been enzymatically treated to at least partially hydrolyze the fiber.

In some embodiments, the fiber may be provided by an exogenous source such as inulin, either as the sole exogenous source of fiber or in combination with an endogenous source of fiber such as a pomace.

Advantageously, when the fiber includes a fruit pomace, the fruit pomace can also provide an endogenous source of mono- and disaccharides, which are useful when seeking to ferment the product. In this regard, while in some embodiments the product is free of exogenous sources of mono- and disaccharides, it is contemplated that the product may contain an exogenous source of mono- and disaccharides, particularly when the product does not include an endogenous source of fiber that includes mono- and disaccharides.

The product also contains a fat, which may provide desirable organoleptic properties. In some embodiments, the fat is provided by almond butter, avocado oil, cocao butter, coconut milk, coconut cream, sunflower oil, or mixtures or combinations thereof.

The product may contain at least 8 grams of whole grain in 120-150 grams of the product. In some instances, 120-150 grams of the product contains from about 1 to about 5 grams beta-glucan. The product may also contain a sufficient amount of protein to provide at least 5 grams of complete protein in 120-150 grams of product.

As noted above, the product may be fermented and accordingly, the product may be inoculated with a fermentation agent such as a lactic acid bacteria. The lactic acid bacteria may be selected from the group consisting of *Streptococcus* thermophiles, *Lactobacillus* delbruckii subsp. *Bulgaricus, Lactobacillus plantarum, Lactobacillus acidophilus*, etc. and mixtures thereof. In some instances, it may be desirable to provide live culture and/or microorganisms (e.g., live microorganisms having probiotic properties). Such probiotic microorganisms include strains such as *Bifidobacterium* BB12, *Bifidobacterium* (HN109), *Lactobacillus rhamnosus* (LGG) and may also include probiotic spore formers such as but not limited to *Bacillus indicus* HU36, *Bacillus clausii, Bacillus subtilis* HU58, *Bacillus licheniformis*, and *Bacillus coagulans, Lactobacillus plantarum* OM, along with other probiotic strains.

The described product is a non-dairy product. In other words, the described products do not contain milk or by-products of milk.

The following disclosure also describes a process for making the nutrient dense non-dairy product. In one aspect, the process includes the following steps. Emulsifying a fat in the presence of protein to form a first mixture. Mixing the first mixture with water, a whole grain ingredient, and fiber to form a final mixture, wherein the final mixture is free of exogenous stabilizers. Pasteurizing the final mixture and subsequently cooling the pasteurized final mixture to a temperature of about 100° F. Inoculating the cooled pasteurized final mixture with a fermentation agent and allowing the final mixture to ferment at a temperature of about 100° F. for a period of time sufficient to achieve a pH of the final mixture to be less than about 4.6. Thereafter, cooling to temperature of less than about 45° F. to terminate (or arrest) the fermentation and to provide a final product.

BRIEF DESCRIPTION OF THE DRAWINGS

The following description accompanies the drawings, all given by way of non-limiting examples that may be useful to understand how the described process and system may be embodied.

DESCRIPTION

The following describes nutrient dense non-dairy products that can be tailored to be drinkable or spoonable. In one aspect, the product contains water, a whole grain ingredient, protein, fiber, and fat, with the product being free of any exogenous stabilizers, i.e., stabilizers that are externally added and are not indigenous to any ingredient. Optionally, the product may contain an exogenous source of a monosaccharide or disaccharide.

It is worthwhile to point out that all the described percentages may not necessarily add to 100 wt. % for a given composition because material included in one range may also be included in another range. For example, the whole grain ingredient (e.g., oat flour) may contain water. Accordingly, some of the mass percentage of the whole grain ingredient contributes to the total water content (i.e., water moisture content) of the product composition. Similarly, the whole grain ingredient may include dietary fiber.

Whole Grain Ingredient

Whole grains include grains like wheat, corn, rice, oats, barley, *quinoa*, sorghum, spelt, rye. As noted above, the whole grain ingredient may be a whole grain flour, a bran concentrate, or a combination of a whole grain flour and bran concentrate. In one aspect, the whole grain is oat or barley. The following description will refer primarily to oats but it should be understood that the reference to oats will be equally applicable to other whole grains (but for the specific reference to beta-glucan).

The use of whole grains are desirable because they are a source of whole grain attributes and in some instances, can provide a desirable level of beta-glucan (at least 0.75 g soluble oat fiber per serving (about 18 g of whole grain oats)). However, it has been found that the use of whole grains may provide a finished product that has an undesirable viscosity, may be ropy, and may even contain lumps.

Accordingly, in certain aspects the product includes whole grains with partially hydrolyzed starch. In addition, to provide additional health benefits to the product, the whole grains are selected from oat and barley, which can provide a sufficient amount of beta-glucan to support a health claim (about 1 to 5 grams of beta-glucan per serving (120-150 grams of the product)).

In some aspects, it may be beneficial to use highly dispersible oat flour that also retains its whole grain standard. The highly dispersible oat flour can be prepared using an extruder or other suitable continuous cooker. An example of a process for preparing a highly dispersible grain flour (e.g., soluble oat or barley flour) is found in U.S. Pat. No. 8,574,644, the entire contents of which is expressly incorporated herein by reference. In one embodiment, a method of producing soluble oat or barley flour includes using a pre-conditioner and an extruder or other suitable continuous cooker, which will partially hydrolyzed starch.

The highly dispersible oat flour may be prepared by combining a whole oat flour starting mixture and a suitable enzyme solution in a mixer (sometimes called a pre-conditioner) and then heating the mixture. The enzyme-treated mixture is then subjected to an extrusion process to hydrolyze, gelatinize, and cook the oat flour mixture.

The enzyme may be any suitable enzyme to partially hydrolyze the starch in the oat flour and does not change or adversely affect the beta-glucan that is present in the oat flour. The enzyme is added to water to form an enzyme water solution. Then the enzyme-water solution is combined with the starting mixture in the pre-conditioner.

Suitable enzymes include α-amylase in the range of about 0.01-0.5%, for example about 0.1-0.2%. In one aspect of the present disclosure, the α-amylase used may be Validase 1000 L having approximately 1,000,000 MWU/g (MWU—Modified Wohlgemuth Unit). Whether the beta-glucan has changed by the partial hydrolysis can be determined by any suitable method such as by analyzing the structure of the beta-glucan. This can be done by laser light scattering mass spectroscopy.

The starting mixture and enzyme solution is heated to between about 120° F. and about 200° F., in particular to between about 140° F. and about 180° F., e.g. 165° F. for about 3 to 5 minutes to initiate gelatinization of starch. The enzyme then reacts on gelatinized starch to break down some of the high molecular weight amylopectin starch fractions (having an average molecular weight of $5.8\text{-}6.2 \times 10^6$ Dalton) into low molecular weight amylopectin starch fractions (having an average molecular weight of $1.7\text{-}2.0 \times 10^6$ Dalton) without completely hydrolyzing the starch into mono- or di-saccharides.

The starting mixture and enzyme solution may be mixed in any suitable vessel such as a high speed mixer that permits liquid to be added to free-flowing flour. The output is a free-flowing wetted flour mixture having a moisture content of about 25 to about 40%. The residence time is the time sufficient to obtain the desired result and typically 1 to 5 min.

The enzyme-treated mixture is subsequently added to an extruder (continuous cooker) to hydrolyze, gelatinize, and cook the starch. The mixture resides in the extruder for a time sufficient to gelatinize and cook the starch, but not long enough to dextrinize or otherwise modify the starch to void the whole grain aspect, generally at least 1 minute, typically, about 1 to about 1.5 minutes. Generally, the material is heated from an initial inlet temperature to a final exit temperature in order to provide the energy for starch gelatinization.

Starch gelatinization requires water and heat. The gelatinization temperature range for oats is 127° F. to 138° F. (53-59° C.). If the moisture is less than about 60% then higher temperatures are required.

Heat may be applied through the extruder barrel wall such as with a jacket around the barrel through which a hot medium like steam, water or oil is circulated, or electric heaters imbedded in the barrel. Typically the extrusion occurs at barrel temperatures between 140° F. and 350° F., for example between 175° F. and 340° F., more specifically about 180° F. to 300° F.

Heat is also generated within the material by friction as it moves within the extruder by the dissipation of mechanical energy in the extruder, which is equal to the product of the viscosity and the shear rate squared for a Newtonian fluid. Shear is controlled by the design of the extruder screw(s) and the screw speed. Viscosity is a function of starch structure, temperature, moisture content, fat content and shear. The temperature of the dough increases in the extruder to approximately 212° F. and 300° F.

Low shear is applied to the mixture in the extruder. As the enzyme has preconditioned the starch, high shear is not required for this process. High shear can dextrinize the starch reducing its molecular weight too much. It can also increase the dough temperature excessively, which can overcook it resulting in too much cooked grain flavor. It is noted that the barrel temperature and the dough temperature may be different.

The process balances limiting the dough temperature to avoid too much cooked grain flavor and to keep the enzyme active. The process is balanced such that the dough temperature rises to a sufficient temperature to deactivate the enzyme. Such temperatures are at least 280° F., generally 212° F. to 300° F. A low shear extrusion process is characterized relative to high shear extrusion by high moisture and a low shear screw design versus low moisture and a high shear screw design.

Any suitable extruder may be used including suitable single screw or twin screw extruders. Typical, but not limiting, screw speeds are 200-350 rpm.

The resulting product may be pelletized using a forming extruder and dried, typically to about 1.5 to about 10%, for example 6.5 to 8.5%, moisture content. The pellets may be granulated to a max 5% though a US 40 screen. The particle size of the resulting granulated product is about 10-500 microns, for instance, about 1-450 microns, more particularly about 30-420 microns.

Jet milling may be used to mill the pellets produced in accordance with aspects of the present disclosure. Jet milling creates ultrafine particles. In particular, jet milling reduces the particle size of the pelletized soluble oat flour to less than about 90 micron, for example, less than about 50 microns, such as about 46 microns. As one of ordinary skill in the art would recognize, alternative milling processes can be used to reduce the particle size or micronize the flour to, 0.5-50 microns, such as between 10 to 50 microns.

The resulting soluble oat flour includes beta glucan soluble fiber, such as beta-1,3-glucan, beta-1,6-glucan, or beta-1,4-glucan or mixtures thereof In addition to beta glucan naturally present in the oats, beta glucan may also be added as approved by the FDA. In certain embodiments, the oat flour preferably contains at least about 3% to 5% or about 3.7% to 4% beta glucan. In certain embodiments, the finished product contains from about 1 to about 5 grams of beta-glucan in 120-150 grams of the finished product. Other amounts of beta glucan are also useful.

Such a soluble oat flour may be known as "SoluOat 100 (or SoluOat 100WT)", "SoluOat 100 flour", or "Solu-Oat 100HP", whether used in the singular or plural form. As used in this description, the terms refer to 99.5% whole oat flour made in accordance with the methods described above (to produce a soluble whole oat flour that maintains its whole grain status and is highly dispersible) and 0.5% mixed tocopherol.

In some embodiments, the soluble whole oat flour (or other whole grain) made in accordance with the described methods described maintains its standard of identity as a whole grain throughout processing (e.g., starch hydrolysis, pelletizing, drying, and/or grinding). "Whole grain" or "standard of identity as whole grain" shall mean that the cereal grain, for example, oat, "consists of the intact, ground cracked or flaked caryopsis, whose principal anatomical components—the starchy endosperm, germ and bran—are present in approximately the same relative proportions as they exist in the intact caryopsis." (See, AACC International's Definition of "Whole Grains," approved in 1999, available at http://www.aaccnet.org/initiatives/definitions/pages/wholegrain.aspx (last accessed Feb. 11, 2016).) Further, if the principal nutrients (i.e., starch, fat, protein, dietary fiber, beta-glucan, and sugar) are present in approximately the same relative proportions for a partially hydrolyzed grain and the original grain, it can be assumed that the processed grain (e.g., the partially hydrolyzed grain) maintains its whole grain status. However, since the average molecular weight of starch (e.g., amylopectin) in whole grains varies widely across the various types of whole grains (e.g., 1-400 million Dalton) and even among whole grain oat products, a shift in starch moieties from higher molecular weight to lower molecular weight does not alter whole grain status if the total starch content remains the same.

Figure 1:
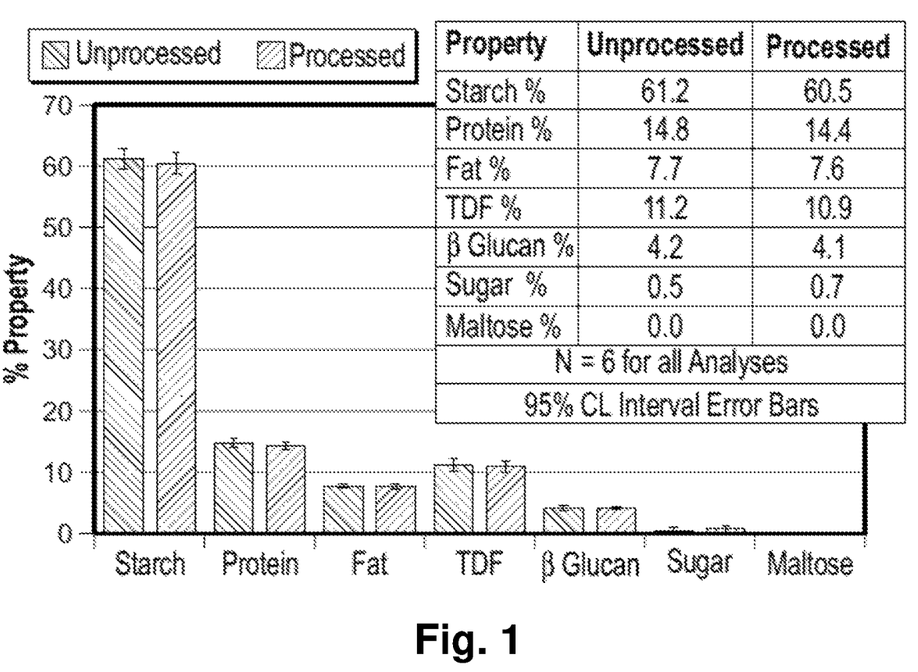
FIG. 1 depicts a proximate composition of unprocessed and processed (i.e., hydrolyzed) oat flour.

As shown, for example, in FIG. 1, the processed oat flour made in accordance with the instant disclosure maintains substantially the same levels of starch, protein, fat, total dietary fiber (TDF), glucan, sugar and maltose as the unprocessed oat flour when considered in terms of relative mass ratios of the components to starch. As used in this description, a mass ratio of X (e.g., starch) to Y (e.g., protein) in a composition (e.g., whole grain) is equal to the mass of X in the composition divided by the mass of Y in the composition. For example, in one embodiment illustrated in FIG. 1, the processed oat flour made in accordance with the instant disclosure experiences a change in the mass ratio of protein to starch of about −0.0038, a change in the mass ratio of fat to starch of about −0.0002, a change in the mass ratio of TDF to starch of about −0.0028, a change in the mass ratio of beta-glucan to starch of about −0.009, a change in the mass ratio of sugar to starch of about 0.0034, and no measurable change in the mass ratio of maltose to starch. Furthermore, in one embodiment the processed oat flour made in accordance with the instant disclosure experiences a relative change in the mass ratio of protein to starch of about −0.016, a relative change in the mass ratio of fat to starch of about −0.002, a relative change in the mass ratio of TDF to starch of about −0.016, a relative change in the mass ratio of beta-glucan to starch of about −0.013, a relative change in the mass ratio of sugar to starch of about 0.416, and no measurable relative change in the mass ratio of maltose to starch. It is evident that the absolute change in the mass ratio is the better indicator of whether whole grain status is maintained because components that are initially present in small amounts can have significant relative increases (e.g., sugar or specific sugars such as maltose). However, when considered as a mass ratio of the component to other components at higher mass concentrations, the change is negligible. Put another way, in some embodiments starch is originally present, for example, at around 50 wt. % or more of a composition while sugar is only present at around 1 wt. % or less.

Accordingly, if a small percentage of the original mass of starch is converted to sugar, or if there is a small measurement error, then there can be what appears to be a significant change in the amount of sugar as measured relative to the original amount of sugar, but for practical purposes the absolute change in sugar is negligible (e.g., the total change of a component in wt. % is no more than about 3 wt. % and the change in the absolute mass ratio of the component to starch is no more than about 0.03). This is so because the total content of the principal nutrients can naturally vary among crops for an unprocessed grain. As a result, a certain degree of tolerance, as illustrated above, can be allowed in determining that the principal nutrients are present in the same relative proportions for a partially hydrolyzed grain and the original grain. In some embodiments, the degree of tolerance is equivalent to the naturally occurring variance in the mass ratios of the principal nutrients to starch in a species or variety of grain. Furthermore, a shift from high molecular weight starch (e.g., amylopectin) to low molecular weight starch (e.g., amylopectin) does not change the total starch content and does not impact whole grain status.

In some embodiments, upon accounting for and excluding the mass of any additional ingredients that are added to oats, the post-hydrolysis starch-to-protein mass ratio of the oats is equal to the pre-hydrolysis starch-to-protein mass ratio of the oats within a tolerance of +/−30, 25, 20, 15, 10, 5, 4, 3, 2 or 1% of the pre-hydrolysis starch-to-protein mass ratio. As an illustration, viewing the mass ratio X:Y as the fraction X/Y, it is possible to convert the tolerance of +/−10% of the pre-hydrolysis starch-to-protein mass ratio into an actual range, namely, X/−0.1*X/Y to X/Y+0.1*X/Y, which is equivalent to 0.9*X/Y to 1.1*X/Y. In some embodiments, the pre-hydrolysis starch-to-protein mass ratio can be equal to about 4.4:1 (e.g., 3.4:1 to 5.4:1). In some embodiments, the starting whole grain oats 0102 can comprise about 12.0 to 13.5 wt. % protein, about 54.0 to 56.75 wt. % starch, or a combination thereof. In some embodiments, the post-hydrolysis starch-to-protein mass ratio can be equal to about 4.1:1 (e.g., 3.1:1 to 5.1:1). In some embodiments, the hydrolyzed whole grain oats can comprise about 12.6 to 12.95 wt. % protein, about 52 to 54 wt. % starch, or a combination thereof.

In some embodiments, the post-hydrolysis fat-to-protein mass ratio is equal to the pre-hydrolysis fat-to-protein mass ratio within a tolerance of +/−30, 25, 20, 15, 10, 5, 4, 3, 2, or 1% of the pre-hydrolysis fat-to-protein mass ratio. In some embodiments, the pre-hydrolysis fat-to-protein mass ratio can be equal to about 0.59:1 (e.g., 0.5:1 to 0.71:1). In some embodiments, the starting whole grain oats 0102 can comprise about 7.4 to 8.1 wt. % fat, about 12.0 to 13.5 wt. % protein, or a combination thereof. In some embodiments, the post-hydrolysis fat-to-protein mass ratio can be equal to about 0.6:1 (e.g., 0.5:1 to 0.7:1). In some embodiments, the hydrolyzed whole grain oats 0104 can comprise about 7.0 to 7.8 wt. % fat, about 12.6 to 12.95 wt. % protein, or a combination thereof.

In some embodiments, the post-hydrolysis sugar-to-protein mass ratio is equal to the pre-hydrolysis sugar-to-protein mass ratio within a tolerance of +/−30, 25, 20, 15, 10, 5, 4, 3, 2 or 1% of the pre-hydrolysis sugar-to-protein mass ratio. In some embodiments, the pre-hydrolysis sugar-to-protein mass ratio can be equal to 0.079:1 (e.g., 0.07:1 to 0.20:1). In some embodiments, the starting whole grain oats 0102 can comprise about 0.9 to 2.6 wt. % sugar, about 12.0 to 13.5 wt. % protein, or a combination thereof. In some embodiments, the post-hydrolysis sugar-to-protein mass ratio can be equal to about 0.075:1 (e.g., 0.07:1 to 0.091:1). In some embodiments, the hydrolyzed whole grain oats 0104 can comprise about 0.86 to 1.20 wt. % sugar, about 12.6 to 12.95 wt. % protein, or a combination thereof.

In some embodiments, the post-hydrolysis beta-glucan-to-protein mass ratio is equal to the pre-hydrolysis beta-glucan-to-protein mass ratio within a tolerance of +/−30, 25, 20, 15, 10, 5, 4, 3, 2 or 1% of the pre-hydrolysis beta-glucan-to-protein mass ratio. In some embodiments, the pre-hydrolysis beta-glucan-to-protein mass ratio can be equal to about 0.26:1 (e.g., 0.25:1 to 0.3:1). In some embodiments, the starting whole grain oats can comprise about 3.2 to 3.8 wt.

% beta-glucan. In some embodiments, the post-hydrolysis beta-glucan-to-protein mass ratio can be equal to about 0.27:1 (e.g., 0.26:1 to 0.4:1). In some embodiments, the hydrolyzed whole grain oats can comprise about 3.4 to 4.13 wt. % beta-glucan.

The term "soluble flour" (e.g., "soluble pulse flour," "soluble grain flour," soluble whole grain flour," "soluble bran flour," "soluble oat flour," or "soluble whole grain oat flour") refers to flour that maintains soluble components such as beta-glucan but also is highly dispersible in liquids such as water. The dispersibility of the flour may be measured in water observing formation of a lump and size of the lumps on the top and bottom of the water after stirring for five (5) seconds. "Highly dispersible" therefore means that there are no lumps present or formed after stirring the mixture for about 5 seconds. As the skilled artisan would recognize, stirring can also be interchanged with shaking or some other specific movement to incorporate and mix the flour into the liquid.

The term "regular oat flour," "typical oat flour," and "unprocessed oat flour" refers to whole oat flour that is made by conventional or traditional milling methods and not "soluble oat flour" or oat flour made in accordance with the methods described herein, unless otherwise clear from context. For example, a whole oat flour with partially hydrolyzed starch (e.g., soluble oat flour made using the methods described herein) can still qualify as a whole oat flour. Accordingly, the term "whole oat flour" in isolation can refer to unprocessed whole oat flour or whole oat flour in which starch has been hydrolyzed without converting the starch to monosaccharides and disaccharides. For example, as discussed earlier, the soluble whole oat flour (or other whole grain) made in accordance with the described methods can maintain its standard of identity as whole grain throughout processing.

Also, for purposes of illustration, the description refers to "oat" or "barley" embodiments. However, in some embodiments, an "oat" component or "barley" component is replaced with another component or group of components that comprise starch. Furthermore, for purposes of illustration, some embodiments are described with reference to soluble flour. Examples of soluble flour include flour made from soluble grain (e.g., wheat, oat, barley, corn, white rice, brown rice, barley, millet, sorghum, rye, triticale, teff, spelt, buckwheat, *quinoa*, amaranth, kaniwa, cockscomb, green groat and combinations thereof). When the term soluble flour is used, flours of any of these whole grains, a portion of any of these grains, and/or any combination can be substituted as applicable in context.

In some embodiments, soluble whole grain oat flour can have a Dw90 particle size equal to no more than about 300 micrometers or 297 micrometers (about U.S. #50 Sieve Size) or no more than about 250 micrometers (about U.S. #60 Sieve Size) or no more than about 210 micrometers (about U.S. #70 Sieve Size). As used in this description, a composition having a "Dw90 particle size" equal to no more than X micrometers means that if all the particles were arranged by size from smallest to largest using screens to provide a distribution of the particles, then upon selecting the smallest particles that provide 90 wt. % of the particles, the selected 90 wt. % of the particles can all pass through a screen having a nominal pore size equal to X micrometers or less.

Determining the Dw90 particle size of a composition can be accomplished using the American Oil Chemists' Society (AOCS) Official Test Method Da 28-39, Revised 2017, entitled "Screen Test for Soap Powders," and incorporated herein by reference. Sifting of the particles can be accomplished using Sonic Sifter Separator Model L3P from Advantech Manufacturing, Inc., of New Berlin, Wis., United States of American. For purposes of providing a standard for measuring the Dw90 particle size using a sieve sifter, the following parameters can be used: a sample size of 3 grams, a sifter frequency equal to 60 Hz, a sifter amplitude setting such that the largest particles in the sample are observed to roll on the sieve surface and no particles in the sample are observed to arc higher than ½ the height of the sifter sieve frame (e.g., a sifter amplitude setting equal to "3" on the Sonic Sifter Separator Model L3P), a test time equal to 10 minutes, and the sieve being subject to both sifting and a vertical pulse or shock wave every 4 seconds (e.g., the "sift pulse" setting is turned "on" for the Sonic Sifter Separator Model L3P).

As an example for determining a Dw90 particle size, the following measurement protocol can be used. First, a 3 g representative well-mixed sample of the material to be measured is placed on a screen (also known as a sieve) having a nominal particle size of X micrometers. Then, the screen and the representative sample are placed in a sieve shaker (e.g., Sonic Sifter Separator Model L3P from Advantech Manufacturing, Inc., with settings as specified above) that uses a vertical, oscillating column of air to cause sufficiently small particles in the representative sample to pass through the screen. The oscillation continues for 10 minutes. After the oscillation stops, if 90 wt. % or more of the mass of the representative sample has passed through the screen, the representative sample of the material has a Dw90 particle size equal to no more than X micrometers. If less than 90 wt. % of the representative sample of the material has passed through the screen, then the material does not have a Dw90 particle size equal to no more than X micrometers.

It was discovered that the use of the soluble oat flour prepared in accordance with the method(s) described above provides unexpected processing improvements and properties over unprocessed oat flour. For example, the use of the soluble oat flour prepared in accordance with the method(s) described above can provide sufficient viscosity while delivering a higher level of whole grain oats to the product without providing off-notes detrimental to the overall flavor of the end product, as compared to commercially available whole oat flours and commercially available low viscosity whole oat flours.

In this regard, it has been found that a composition containing 6.6 wt % the soluble oat flour prepared in accordance with the method(s) described above in water, exhibits a viscosity less than 1000 cP and greater than 200 cP over a temperature range of 4° C. to 65° C. In contrast, compositions containing commercially available whole oat flours or oat flours either exhibited a significantly lower viscosity, i.e., less than about 50 cP, which resulted in an end product that was not suitable as a yogurt-type product (the end product was watery) or exhibited a greater viscosity, i.e., greater than 1000 cP over the entire temperature range (resulting in processing challenges) that led to unsuitable end products.

The above viscosity values were obtained using Anton Paar MR92 with parallel plates with sandblasted plates, shear at 30r-s, gap 0.5 mm, temperature ramp from 4° C. to 65° C. using a solvent trap to prevent sample evaporation.

The finished product may contain from about 1% to about 15%, or from about 2% to about 10%, or from about 3% to about 8%, or from about 4% to about 6% whole grain flour, particularly soluble whole grain flour and in some instances, soluble whole oat flour.

Bran Concentrate

Alternatively or in addition to the soluble whole grain flour, it may be useful to include a bran concentrate such as an oat bran concentrate and particularly a soluble bran concentrate such as soluble oat bran concentrate. An oat bran concentrate typically contains a greater amount of beta-glucan and fiber than does the whole grain. For example, an oat bran concentrate may contain at least 10 wt. % beta-glucan and at least about 29.1% dietary fiber on a dry weight basis.

Soluble oat bran concentrates are typically produced using a combination of mechanical processing and enzymatic treatment. For example, whole oat groats (de-hulled) are processed through sequential milling and separation steps to generate oat bran concentrate, which is further processed through extrusion, optional enzymatic addition and drying. The result is a powdered ingredient rich in soluble beta-glucan that keeps intact the molecular structure and therefore its functional properties, but also reduces the viscosity of the oat bran concentrate so that it is usable for drinkable products.

Tables 1-3 provide examples of compositions with various characteristics (e.g., reduced viscosity) as a result of certain listed extrusion conditions. For example, Table 1 shows a portion of a grain, namely oat bran concentrate, before and after extrusion under various extrusion conditions. As can be seen, extruding oat bran concentrate without enzyme catalyzed hydrolysis resulted in some reduction in the Rapid Visco Analyzer (RVA) peak viscosity of the oat bran concentrate from 7,879 cP to 6,692 cP. The RVA is a rotational viscometer that is able to continuously record the viscosity of samples under controlled temperature and shear rate conditions.

Extrusion with cellulase-catalyzed hydrolysis resulted in greater reduction in the RVA peak viscosity, to about 5,235 cP. Similarly, extrusion with α-amylase-catalyzed hydrolysis resulted in reduction in the RVA peak viscosity, namely, to 3,028 cP and 2,806 cP, depending on the enzyme concentration. Furthermore, extrusion with both cellulase-catalyzed hydrolysis and α-amylase-catalyzed hydrolysis resulted in a greater reduction in the RVA peak viscosity. It is worthwhile to point out that the viscosity of the dough can affect the pressure and temperature of the dough within the extruder. For example, greater viscosity can result in greater friction-related temperature increases. Similarly, if pressure is measured at one point, a more viscous composition will result in greater pressure at the same point, as a result of frictional pressure loss as the composition is conveyed.

With reference to the Tables 1-3, it is also worthwhile to note that the listed values pertain to a composition comprising flour, water moisture, optionally tocopherol, and optionally enzyme, as indicated. Accordingly, the mass concentrations in the Tables (e.g., wt. %) are given as a fraction of the mass of the composition. Additionally, the moisture (i.e. water moisture including inherent and added water) in the following tables (e.g., Table 1) was generally determined by measuring the composition before and after dehydration and assuming that the difference in weight was caused by evaporation of water.

TABLE 1

Oat Bran Concentrate, wt. % of component, with moisture

| Component | Stream Description | | | | | |
|---|---|---|---|---|---|---|
| | 0 | 1 | 2 | 3 | 4 | 5 |
| Moisture (water) | 7.9 | 7.24 | 8.62 | 7.72 | 9.34 | 10.81 |
| Starch | 31.95 | 32.95 | 31.31 | 30.02 | 29.81 | 29.17 |
| Fat | 10.94 | 9.65 | 9.49 | 9.69 | 9.44 | 9.39 |
| Protein | 19.21 | 18.87 | 18.69 | 19.08 | 18.86 | 18.41 |
| Total Dietary Fiber ("TDF") | 25.2 | 24.9 | 23.9 | 26.2 | 24.6 | 25 |
| Insoluble Dietary Fiber ("IDF") | 21.6 | 15.2 | 14.6 | 19 | 15.6 | 15.1 |
| β-glucan | 11.52 | 11.61 | 11.63 | 12.3 | 12.03 | 12.01 |
| Total sugar | 2.43 | 2.4 | 2.61 | 2.07 | 2.57 | 2.67 |
| Maltose | BQL | BQL | BQL | BQL | 0.28 | BQL |

TABLE 2

Oat Bran Concentrate, wt. % of component, dry basis

| Component | Stream Description | | | | | |
|---|---|---|---|---|---|---|
| | 0 | 1 | 2 | 3 | 4 | 5 |
| Moisture | 0 | 0 | 0 | 0 | 0 | 0 |
| Starch | 34.7 | 35.5 | 34.3 | 32.5 | 32.9 | 32.7 |
| Fat | 11.9 | 10.4 | 10.4 | 10.5 | 10.4 | 10.5 |
| Protein | 20.9 | 20.3 | 20.5 | 20.7 | 20.8 | 20.6 |
| Total Dietary Fiber ("TDF") | 27.4 | 26.8 | 26.2 | 28.4 | 27.1 | 28.0 |
| Insoluble Dietary Fiber ("IDF") | 23.5 | 16.4 | 16.0 | 20.6 | 17.2 | 16.9 |
| β-glucan | 12.5 | 12.5 | 12.7 | 13.3 | 13.3 | 13.5 |
| Total sugar | 2.6 | 2.6 | 2.9 | 2.2 | 2.8 | 3.0 |
| Maltose | BQL | BQL | BQL | BQL | 0.3 | BQL |
| B-glucan MW, Million Dalton | 1.35 | 1.39 | 0.85 | 1.31 | 1.25 | 0.67 |
| RVA peak viscosity, cP | 7879 | 6692 | 5235 | 3028 | 2806 | 1703 |

TABLE 3

Oat Bran Concentrate Extrusion Parameters

| Parameter | 0 | 1 | 2 | 3 | 4 | 5 |
|---|---|---|---|---|---|---|
| | | | Stream Description | | | |
| Type of extruder | N/A | | Werner & Pfleiderer Extruder ZSK-58 | | | |
| Feed rate of flour, lb/hr (kg/hr)** | N/A | 320 (145.15) | 320 (145.15) | 320 (145.15) | 320 (145.15) | 320 (145.15) |
| Tocopherol, wt. % | N/A | 0.1 | 0.1 | 0.1 | 0.1 | 0.1 |
| Enzyme type | N/A | N/A | c | α | α | c \| α |
| Enzyme amount, wt. % | N/A | N/A | 1.5 | 0.09 | 0.12 | 1.5 \| 0.12 |
| Moisture at preconditioner exit/ extruder inlet, wt. % | N/A | 33 | 33 | 34 | 34 | 34 |
| Dough temperature at preconditioner exit/ extruder inlet (e.g., wet mix temperature), °F. (° C.) | N/A | 173 (78.33) | 152 (66.67) | 175 (79.44) | 169 (76.11) | 169 (76.11) |
| Extruder screw speed, RPM | N/A | 307 | 297 | 307 | 307 | 307 |
| Residence time, min | N/A | 1 | 1 | 1 | 1 | 1 |
| Pressure at exit end of extruder screw, PSI | N/A | 860 | 980 | 1072 | 1101 | 1160 |
| Barrel temperature, °F. (° C.) | N/A | T | T | T | T | T |
| Extruder die wall exit temperature, °F. (° C.) | N/A | 325 (162.78) | 318 (158.89) | 314 (156.67) | 312 (155.56) | 309 (153.89) |

TABLE 4

Key for Tables 1-3

| | |
|---|---|
| * | not measured |
| BQL | below quantifiable level (present, if at all, at a level that is below detectable limits) |
| ** | The given feed rate in pounds per hour comprises flour, moisture, enzyme and tocopherol, as applicable. Although the mass concentration of flour (i.e., wt. % of flour) as a fraction of the feed rate is not explicitly given as It is for tocopherol, enzyme, and moisture (i.e., water) content, the mass concentration of the flour can be calculated by assuming the composition for which the feed rate is given consists of flour, moisture, and optionally tocopherol and/or enzyme, as indicated in the Tables. Accordingly, anything that is not moisture, tocopherol, and enzyme is deemed to be flour. |
| 0 | flour feed, unextruded, without tocopherol and without enzyme |
| 1 | flour extruded with tocopherol, but without enzyme |
| 2 | flour extruded with tocopherol and with 1.5 wt. % cellulase as percentage of total composition including cellulase |
| 3 | flour extruded with tocopherol and with 0.09 wt. % α-amylase as percentage of total composition including α-amylase |
| 4 | flour extruded with tocopherol and with 0.12 wt. % α-amylase as percentage of total composition including α-amylase |
| 5 | flour extruded with 0.12 wt. % α-amylase & 1.5 wt. % cellulase as percentage of total composition including α-amylase & cellulase |
| N/A | not applicable |
| c | cellulase |
| α | α-amylase |
| T | Temperature (+/−5° F. or 2.8° C.) in adjacent and sequentially ordered extruder barrel zones 1, 2, 3, 4, 5: 170° F. (76.67° C.), 200° F. (93.33° C.), 225° F. (107.22° C.), 275° F. (135° C.), 300° F. (148.89° C.), respectively |

The finished product may contain from about 1% to about 15%, or from about 2% to about 10%, or from about 3% to about 8%, or from about 3.5% to about 5% bran concentrate, in addition to or in the absence of whole grain flour.

Protein

Consumers of dairy-based yogurts expect a certain level of protein in their product. Typical yogurts contain about 5 grams of protein per serving (one serving is typically about 120-150 grams) and Greek-type yogurts may contain about 11 grams of protein per serving (one serving is typically about 120-150 grams). Accordingly, in one aspect the composition includes a source of protein; for instance, a plant protein source. A suitable plant protein source may be provided by legumes. For example, the legume may include, but is not limited to lentils, chickpeas, kidney beans, lima beans, garbanzo beans, black beans, pinto beans, soybeans, yellow peas, green peas and combinations thereof. In one embodiment, the protein source is provided by pea protein, particularly yellow pea. An example of a suitable pea protein may be obtained from Puris (Minneapolis, Minn.).

Typically, the protein source may be provided as a protein isolate and in some embodiments is not denatured. It is contemplated that denatured protein isolates may be useful in the described compositions.

The protein may be present in the composition in an amount sufficient to provide at least 1 gram of complete plant protein in 120 to 150 grams of the finished product. In some aspects the protein is present in the finished product in an amount from about 2 gram to about 25 gram of complete protein per serving (120-150 grams of finished product), or from about 4 gram to about 20 gram of complete protein, or from about 5 gram to about 15 gram complete protein per serving (i.e., per 120-150 g of finished product).

In some aspects, the finished product contains an amount of plant protein from about 2%, 3%, 4%, 5%, 6%, 7%, 8%, 9%, or about 10% and up to about 20%. In other aspects, the plant protein is present in an amount from about 2% to about 20%, or from about 5% to 10%.

Monosaccharide and Disaccharide

To provide a sweetness attribute in the finished product and to provide a substrate for fermentation during processing, the starting composition contains a source of monosaccharides and/or disaccharides. The source of mono- and/or disaccharides may be from an endogenous source, an exogenous source or a combination of an endogenous and exogenous source. The term "endogenous" refers to those mono- and di-saccharides that are a naturally occurring in, for example, fruits. Accordingly, an endogenous source of mono- and di-saccharides may be from fruits, fruit purees, and pomace generated from the processing of fruits where the fruits, fruit purees, or pomace is included into the product.

On the other hand, "exogenous" refers to a source of mono- and di-saccharides that are provided in a manner other than by endogenous sources, i.e., in a manner other than by providing the fruits, fruit purees, or pomace. For example, bulk refined sucrose or dextrose is an exogenous source and, in some instances, may be included in the product.

The amount of exogenous mono- and disaccharides included in the composition is sought to be limited so that the overall caloric content of the finished product is not unduly high. In this regard, the amount of exogenous mono- and disaccharides is less than about 5%, 4%, 3%, 2%, 1% and in some instances, the product does not contain any exogenous mono- or disaccharides.

Fiber

The composition may also contain a source of fiber. The fiber may be provided from any suitable source such as endogenous, exogenous, and a combination of endogenous and exogenous source of fiber. In certain embodiments, the fiber is provided entirely from endogenous sources. In other embodiments, the fiber is provided from a combination of endogenous and exogenous sources.

While the whole grain ingredient may provide an endogenous source of fiber, it is contemplated to provide another endogenous source of fiber. From a textural and organoleptic standpoint, it has been found that pomace (either vegetable or fruit pomace) may be suitable. Advantageously, in some instances, a fruit pomace may provide a sufficient endogenous source of sugar to accomplish the fermentation and, at the same time provide textural benefits such as reducing ropiness of a yogurt product. While any fruit pomace may be suitable, it has been found that apple pomace can provide a suitable combination of organoleptic properties, fiber, and mono- and disaccharides.

The term "pomace" refers to the by-product remaining after fruit juice pressing processes, wine crush operations, puree and concentrate operations, canning processes, and other food manufacturing processes. The pomace is typically discarded in the waste stream during processing. Pomace may include, for example, skins, peel, pulp, seeds, cellulosic material, and edible part of stems of the fruit such as apples. Pomace generally contains more than a single item, for example, pomace may contain at least skin and pulp. In some cases the pomace can derive from or contain other parts of the fruit such as pod, stalk, flower, root, leaves and tuber. Pomace resulting from juice extraction is typically in the form of a part of a press cake. Pomace differs from pulp. Pulp is the soft mass of fruit matter from which most of the water has been extracted via pressure. For example, orange pomace includes membrane, but orange pulp does not. Further, apple pomace can contain skin, but apple pulp does not.

Wet pomace, which generally has a moisture content in the range between 70-85 wt %, generally contains high dietary fiber content, and varying amounts of essential vitamins, minerals and phytonutrients (depending on the types of fruit and process applied). For example, pomace may contain natural nutrients (such as vitamin A, vitamin C, vitamin E, phytonutrients such as polyphenols and antioxidants), flavors, colors of the original fruit and a large amount of natural (e.g., un-processed) fibers.

In some aspects, the pomace is enzymatically-treated which will lower its viscosity while maintaining its fiber content, i.e., the enzymatic treatment does not hydrolyze the fiber to mono- or disaccharides. The term "enzymatically-treated" means adding an enzyme to the pomace to reduce the chain length of the fibrous material. The enzyme may be any enzyme that reduces the chain length of the targeted fiber to lower its molecular weight without releasing sugars (mono- and/or disaccharides). In this manner, the total fiber content of the enzymatically treated pomace is substantially the same as the total fiber content of the starting pomace. In certain implementations, the enzyme used to treat the pomace may include pectinase, hemicellulase, cellulase, or any combination of the aforementioned enzymes. In one embodiment, the enzyme may be added to wet pomace in an amount of between 0.30 to 1 wt %, or between 0.15 to 1 wt %, but in some embodiments, an amount that is at least between 0.15 to 0.75 wt % of the pomace.

The enzymatic treatment takes place under certain conditions in order to achieve a pomace that provides a substantial amount of fiber, yet has a reduced viscosity as compared to a non-enzymatically treated pomace. For instance, the mixture of wet pomace and enzyme may be heated, agitated, and/or mixed during enzymatic treatment. In one embodiment, the enzymes are combined with the pomace and the mixture of enzyme(s) and pomace is preheated to at least about 25° C., for example, to about 25° C.-60° C. The mixture is then allowed to react at the heated temperature. The mixture may be agitated or mixed while preheating and/or during the reaction. In general, the enzyme/pomace mixture is allowed to react for about 10 minutes to about one hour. The reaction time and temperature are monitored and controlled to achieve this goal.

Following enzymatic treatment, the enzyme is deactivated. The enzyme may be deactivated using any method sufficient to deactivate the enzyme, including, without limitation, sterilization, pasteurization or otherwise subjecting the mixture to high temperature, short time (HTST) or ultra-high temperature (UHT) for a short time. For example, the enzyme is deactivated by heating to 75° C. to 107° C. for a period of time between 6 seconds to 600 seconds.

A suitable method and resulting product for preparing enzymatically-treated pomace is described in US Patent Application Publication 2017/0055550, the entire contents of which are incorporated herein by reference. In some embodiments, the enzymatically-treated pomace prepared in accordance with the present disclosure has substantially the same fiber content as untreated pomace, but with shorter chain lengths. Thus, the overall fiber content is maintained during processing, as illustrated in Table 5, which compares the nutritional compositions of untreated orange pomace and enzyme-treated orange pomace.

TABLE 5

|  | no-enzyme treatment | enzyme treatment 1 | enzyme treatment 2 | enzyme treatment 3 |
| --- | --- | --- | --- | --- |
| Fat (%) | 0.1 | 0.1 | 0.1 | 0.11 |
| Protein (%) | 1.16 | 1.25 | 1.3 | 1.35 |
| Total Sugars (%) | 9 | 8.7 | 8.9 | 8.9 |
| Aarabinose (%) | 0.4 | 0.5 | 0.5 | 0.4 |
| Xylose (%) | BQL | BQL | BQL | BQL |
| Rhamnose (%) | BQL | BQL | BQL | BQL |
| Galactose (%) | BQL | BQL | BQL | BQL |
| Fructose (%) | 2.6 | 2.7 | 2.8 | 2.9 |
| Glucose (%) | 2.2 | 2.3 | 2.4 | 2.5 |
| Sucrose (%) | 4.2 | 3.7 | 3.7 | 3.5 |

TABLE 5-continued

|  | no-enzyme treatment | enzyme treatment 1 | enzyme treatment 2 | enzyme treatment 3 |
| --- | --- | --- | --- | --- |
| Maltose (%) | BQL | BQL | BQL | BQL |
| Lactose (%) | BQL | BQL | BQL | BQL |
| Total Dietary Fiber (%) | 3.5 | 2.9 | 3.1 | 3 |
| Viscosity (cp) | 14620 | 3040 | 2120 | 2170 |
| Vitamin C (mg/100 g) | 24.07 | 24.38 | 23.64 | 21.38 |

BQL: Below Quantification Limit

In addition to the benefits of including viscosity reduction and fiber retention, the use of enzymatically treated pomace provides a desirable mouthfeel of the resulting product. Moreover, products containing the enzymatically-treated pomace exhibit reduced sliminess and ropiness that might otherwise be present as a result of the whole grain ingredient or bran concentrate.

In some embodiments, the resulting product has a thicker, smoothie-like or spoonable consistency typical of regular or "Greek-style" yogurt. The use of enzymatically-treated pomace enables the creation of a product that has a higher amount of fiber, but without further increasing the viscosity to levels that may be unexpected or undesirable for consumers. Some such products may be referred to as "spoonable".

The amount of pomace present in the finished product may range from about 1% to about 15%, from about 2% to about 13%, from about 3% to about 11%, from about 4% to about 10%, from about 5% to about 9%, from about 6% to about 8%.

As noted above, it may be desirable to provide an exogenous source of fiber. A suitable source of exogenous fiber is inulin. Inulin is a heterogeneous collection of fructose polymers. It consists of chain-terminating glucosyl moieties and a repetitive fructosyl moiety, which are linked by β(2,1) bonds. The degree of polymerization (DP) of standard inulin ranges from 2 to 60. After removing the fractions with DP lower than 10 during manufacturing process, the remaining product is high-performance inulin.

Because of the β(2,1) linkages, inulin is not digested by enzymes in the human alimentary system, contributing to its functional properties: reduced calorie value, dietary fiber, and prebiotic effects.

The exogenous source of fiber may be present in the finished product in amounts ranging from about 1% to about 10%, from about 2% to about 8%, from about 3% to about 6%, from about 4% to about 5%.

Fat

The composition may also contain an amount of fat to provide desirable texture attributes. A suitable source of fat is almond butter, avocado oil, cacao butter, coconut milk, coconut cream, sunflower oil, or mixtures or combinations thereof. One suitable source is coconut milk and/or coconut cream. Coconut milk and cream are derived from coconuts by grating the inner white flesh of coconuts and mixing the shredded coconut pulp with water to suspend the fat. For coconut milk and cream products, fat content is the important criteria for categorization. According to Codex Standards for Aqueous coconut products (CODEX STAN 240-2003), coconut milk should contain at least 10% fat, 2.7% non-fat solids, and 12.7-25.3% total solids. For coconut cream, it should contain at least 20% fat, 5.4% non-fat solids and 25.4-37.3% total solids. In one embodiment, the composition contains a coconut milk having about 16% solids.

The amount of the fat present in the composition may be in the range of about 2% to about 14%, or about 4% to about 12%. In some instances a suitable amount is about 8%.

Fermentation Agent

To provide either fermented beverages or a spoonable yogurt-type product, the composition includes a fermentation agent. Examples of suitable fermenting agents include, but are not limited to yeast, bacteria, or a combination of yeast and bacteria. Examples of yeast include *Saccharomyces, Candida, Kluyveromyces*, and a combination thereof. Examples of bacteria include *Lactobacillus* species, for example, *Lactobacillus acidophilus, Lactobacillus delbruckii* subsp. *bulgaricus, Lactobacillus paracasei, Lactobacillus plantarum, Lactobacillus sanfrancisco*, other lactic acid bacteria, for example, *Streptococcus thermophilus, Bifidobacterium, Lactococcus* species, *Leuconostocs, Pediococcus*, or any combination thereof. In some embodiments, the bacteria is a bacteria that is used for lactic acid fermentation such as, but not limited to *S. thermophilus, L. bulgaricus, Lactococcus lactis* subsp. *cremoris, Lactococcus lactis* subsp. *lactis, L. curvatus, L. plantarum, Pediococcus, L. lactis, Leuconostoc, L. acidophilus*.

In some aspects, the fermenting agent is a combination of *Streptococcus thermophilus* and *Lactobacillus delbruckii* subsp. *bulgaricus*.

It may also be desirable to provide culture blends that contain probiotic strains such as *Bifidobacterium* BB12, *Bifidobacterium* (HN109), *Lactobacillus rhamnosus* (LGG) and may also include probiotic spore formers such as but not limited to *Bacillus indicus* HU36, *Bacillus clausii, Bacillus subtilis* HU58, *Bacillus licheniformis*, and *Bacillus coagulans, Lactobacillus plantarum* OM, along with other probiotic strains. The probiotic strains may be added to the product after the fermentation step.

The fermenting step may occur under specified fermentation conditions. For example, the fermenting can occur at a pressure of 100-500, or 100-400, or 100-300, or 100-200, or 100-150 kPa (e.g. 101.325 kPa); at a temperature of 25°-45°, 25°-40°, 25°-35°, 25°-30°, 30°-35°, 35°-40°, 40°-45°, or 35°-45° C.; under static conditions or with stirring, mixing, or agitation; at a pH of 5.0-7.8 at the start of fermentation; at a desired redox potential; at a desired ionic strength; after or at the time of inoculating the fermentation agent to provide an amount of the inoculated fermentation agent in the range of $10^5$-$10^8$ colony forming units per milliliter (CFU/ml) of the inoculated product; for 1-36, 1-30, 1-25, 1-20, 1-15, 1-10, 1-5 hours or a combination thereof.

The fermentation is conducted at a temperature and for a time sufficient to achieve a pH of about 5, or about 4.9, or about 4.8, or about 4.7, or about 4.6, or about 4.5 or less (i.e., about 4.0 to about 4.1). In some instances, the time sufficient to achieve a pH of about 4.6 or less is from about 4-16 hours, from about 5-10 hours, or from about 6-8 hours.

Additional Ingredients

It may also be desirable to provide culture blends that contain probiotic microorganisms so that the resulting non-dairy product can be identified as providing probiotics. Suitable probiotic microorganisms include strains of *Lactobacillus* and *Bifidobacterium* as well as yeasts such as *Saccharomyces boulardii*. In some instances, the probiotic microorganisms include *Bifidobacterium adolescentis, Bifidobacterium bifidum, Bifidobacterium anamalis, Bifidobacterium lactis, Bifidobacterium infantis, Bifidobacterium longum, Lactobacillus casei, Lactobacillus plantarum, Lactobacillus acidophilus, Lactobacillus brevis, Lactobacillus reuteri Lactobacillus rhamnosus* (LGG). Suitable *Bifidobacterium* strains also include *Bifidobacterium* BB12 and/or

*Bifidobacterium* (HN109). The probiotic microorganisms may be added to the product with the fermentation agent or after the fermentation step so that 120-150 grams of the finished product contains an amount to confer a desired health benefit, which in some instances may be at least $1\times10^3$ CFU/g, at least $1\times10^4$ CFU/g, at least $1\times10^5$ CFU/g, at least $1\times10^6$ CFU/g, or may be at least $1\times10^7$ CFU/g.

The disclosed products may optionally contain a flavoring composition, for example, natural and synthetic fruit flavors, botanical flavors, other flavors, and mixtures thereof. As used here, the term "fruit flavor" refers generally to those flavors derived from the edible reproductive part of a seed plant. Included are both those where a sweet pulp is associated with the seed, e.g., banana, tomato, cranberry and the like, and those having a small, fleshy berry. The term berry also is used here to include aggregate fruits, i.e., not "true" berries, but that are commonly accepted as a berry. Also included within the term "fruit flavor" are synthetically prepared flavors made to simulate fruit flavors derived from natural sources. Examples of suitable fruit or berry sources include whole berries or portions thereof, berry juice, berry juice concentrates, berry purees and blends thereof, dried berry powders, dried berry juice powders, and the like.

Exemplary fruit flavors include the citrus flavors, e.g., orange, lemon, lime and grapefruit, and such flavors as apple, pomegranate, grape, cherry, and pineapple flavors and the like, and mixtures thereof. As used herein, the term "botanical flavor" refers to flavors derived from parts of a plant other than the fruit. As such, botanical flavors can include those flavors derived from essential oils and extracts of nuts, bark, roots and leaves. Also included within the term "botanical flavor" are synthetically prepared flavors made to simulate botanical flavors derived from natural sources. Examples of such flavors include cola flavors, tea flavors, and the like, and mixtures thereof. The flavor component can further comprise a blend of the above-mentioned flavors. The particular amount of the flavor component useful for imparting flavor characteristics to the beverages of the present invention will depend upon the flavor(s) selected, the flavor impression desired, and the form of the flavor component. Those skilled in the art, given the benefit of this disclosure, will be readily able to determine the amount of any particular flavor component(s) used to achieve the desired flavor impression.

Other flavorings suitable for use in at least certain exemplary embodiments of the disclosed products include, e.g., spice flavorings, such as *cassia*, clove, cinnamon, pepper, ginger, vanilla spice flavorings, cardamom, coriander, root beer, *sassafras, ginseng*, and others. Numerous additional and alternative flavorings suitable for use in at least certain exemplary embodiments will be apparent to those skilled in the art given the benefit of this disclosure. Flavorings can be in the form of an extract, oleoresin, juice concentrate, bottler's base, or other forms known in the art. In at least certain exemplary embodiments, such spice or other flavors complement that of a juice or juice combination.

The disclosed products may also contain additional ingredients such as those typically found in food or beverage formulations. Examples of such additional ingredients include, but are not limited to, salt, caffeine, caramel and other coloring agents or dyes, antifoaming agents, tea solids, cloud components, and mineral and non-mineral nutritional supplements.

Suitable minerals include, but are not limited to, added calcium, chloride, chromium, potassium, magnesium, phosphorous, sodium, sulfur, cobalt, copper, fluorine, iodine, manganese, molybdenum, nickel, selenium, vanadium, zinc, iron, and the like, derivatives, and mixtures thereof. The minerals may be added in any form compatible with human nutritional requirements and may be added to any desired level. The amounts in the food product or formulation may be at any suitable percentage of the Reference Daily Intake (RDI). For example, the mineral may be present at an upper or lower limit of about: 2%, 5%, 10%, 20%, 25%, 30%, 40%, 50%, 60%, 75%, 100%, 150%, 200%, 300%, 400%, or about 500% of the RDI. Alternatively, the amount of added mineral may be measured in international units (IU) or weight/weight (w/w). It should be understood that the term "added" (e.g., "added calcium") as used herein refers to an added component obtained from external sources and does not include a component that is inherently present in the food product or formulation. For example, "added calcium" as used herein means that the calcium is obtained from external sources and does not include calcium that is inherent in the food product or formulation. Suitable added minerals can be derived from any known or otherwise effective nutrient source that provides the targeted mineral separately. For example added calcium sources include, but are not limited to, e.g., calcium citrate, calcium phosphate, or any other calcium source suitable for use in a food product or formulation.

Examples of non-mineral nutritional supplement ingredients are known to those of ordinary skill in the art and include, for example, antioxidants and vitamins, including Vitamins A, D, E (tocopherol), C (ascorbic acid), $B_1$ (thiamine), $B_2$ (riboflavin), $B_3$ (nicotinamide), $B_4$ (adenine), $B_5$ (pantothenic acid, calcium), $B_6$ (pyridoxine HCl), $B_{12}$ (cyanocobalamin), and $K_1$ (phylloquinone), niacin, folic acid, biotin, and combinations thereof. The optional non-mineral nutritional supplements are typically present in amounts generally accepted under good manufacturing practices. Exemplary amounts are between about 1% and about 100% RDV, where such RDV are established. In certain exemplary embodiments the non-mineral nutritional supplement ingredient(s) are present in an amount of from about 5% to about 20% RDV, where established.

The additional ingredients, when present, are provided in amounts ranging from about 0.1% to about 2%, individually or collectively.

In some embodiments, the viscosity of the product seeks to approximate that of typical commercial dairy yogurt which may have a viscosity of from about 20 Pa·s (stirred yogurt) to about 50 Pa·s (Greek yogurt). Advantageously, it has been found that the described product provides desirable organoleptic attributes and viscosity in the absence of exogenous stabilizers, thickeners, and gums. Accordingly, the described products may be considered to be free of exogenous stabilizers, thickeners, and gums and in some instances, the described products do not contain or are free of exogenous stabilizers, thickeners, or gums and may be free of exogenous stabilizers, thickeners and gums.

In other embodiments, the viscosity of the product seeks to approximate that of typical milkshake beverages which may have a viscosity on the order of about 10 cP to about 600 cP.

Water

Water comprises the remaining ingredient of the finished product and is present in a sufficient amount to hydrate the whole grain ingredient(s). Typically, the amount of water ranges from about 70% to about 95%, or about 75% to about 90%.

Process

Figure 2:
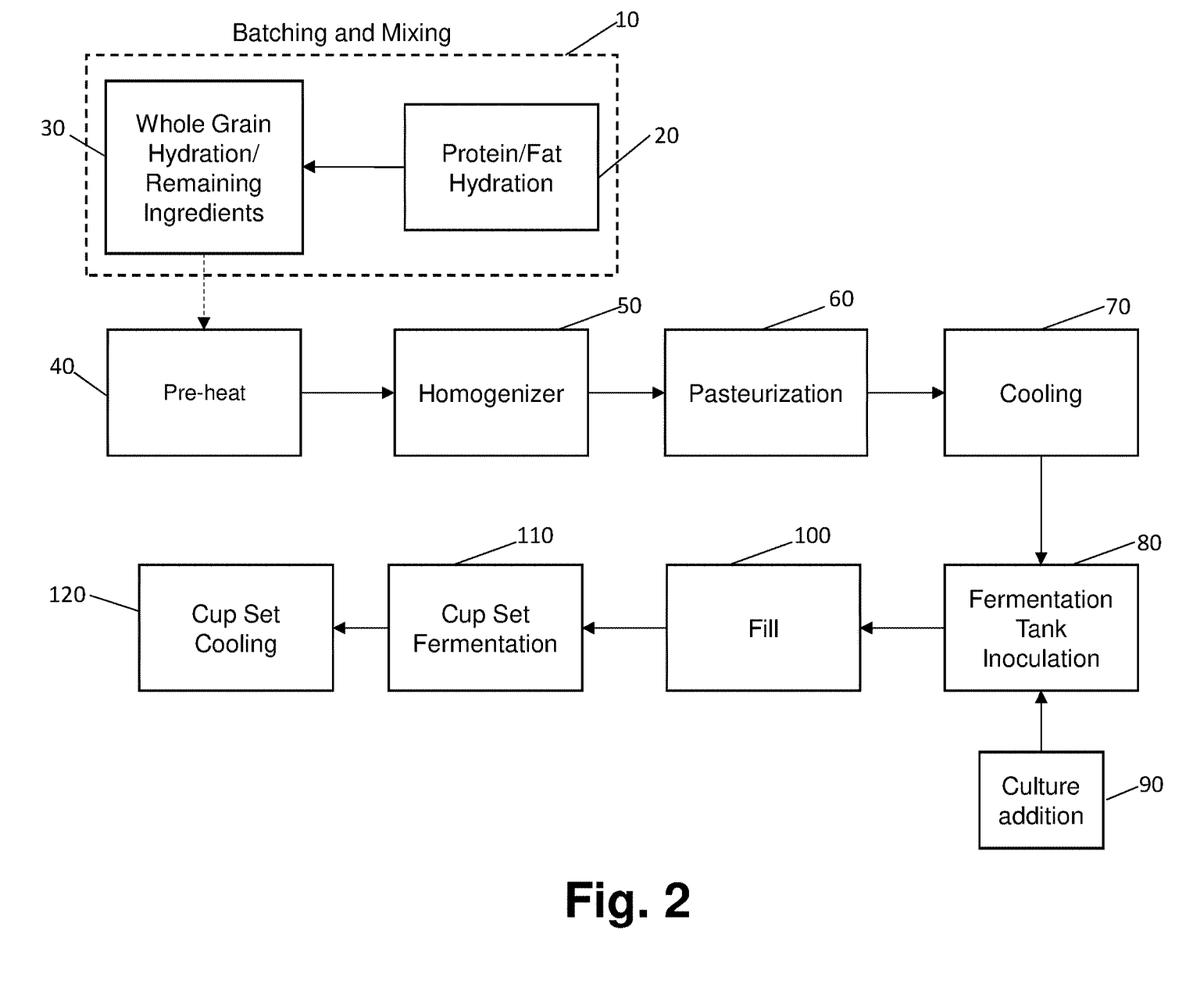
FIG. 2 is schematic of one method of making a product according to the following disclosure.

Turning now to FIG. 2, an exemplary process for making a spoonable composition is shown. In a first step 10, the intended ingredients, but for any fermentation or probiotic agents, are batch mixed. The batch mixing 10 typically includes two sub-steps. A first sub-step 20 mixes the protein and fat at a suitable temperature and for a period of time to emulsify the fat to form a first mixture. A suitable temperature is from about 125° F. to about 155° F., or about 140° F. for about 5-15 minutes and in some instances for about 10 minutes.

A second sub-step 30 mixes the whole grain ingredient with the first mixture and the other ingredients, such as fiber (both endogenous and exogenous), water, and any additional ingredients (such as exogenous mono- and disaccharides or exogenous fiber) at a suitable temperature and for a period of time to sufficiently hydrate the whole grain ingredient and to thoroughly blend all the ingredients to form a final mixture. A suitable temperature is from about 125° F. to about 155° F., or about 140° F. for about 15 to 45 minutes and in some instances for about 30 minutes.

Thereafter, the final mixture may optionally be homogenized in a homogenizer 50, with or without preheating prior to homogenization, to ensure complete and intimate mixing of all the ingredients. The final mixture, whether homogenized or not, may optionally be pre-heated 40 prior to homogenization 50 and pasteurization 60. The pre-heat 40 can be accomplished using any suitable heat exchanger such as a tube-in tube heat exchanger to increase the temperature of the final mixture to a range of about 100° F. to about 175° F. Advantageously, it has been found that the use of a soluble whole grain ingredients allows the final mixture to be processed in common processing equipment since the viscosity of the final mixture is not too high.

After optional pre-heating 40 and homogenization 50, the homogenization final mixture is pasteurized 60 by passing the final mixture through a pasteurizer to raise the temperature of the final mixture to range of about 175° F. to about 195° F., typically about 185° F.

After pasteurization, the final mixture is cooled 70 to about 100° F. prior to directing the final mixture to a fermentation vessel 80 where the cooled final mixture is inoculated with fermentation agent(s) and optionally probiotic agents 90.

After the final mixture has been inoculated, the product vessels, i.e., cups are filled and sealed 100 and then allowed to ferment in the cup 110 at a temperature of about 100° F. for a period of time sufficient to achieve a pH about below about 4.6 depending on the desired taste profile sought. The time necessary to achieve the desired pH is from about 4-10 hours, or from about 6-8 hours. Thereafter, the product vessels containing the fermented final product are cooled to a temperature of less than about 45° F.

Alternatively, the inoculated final mixture may be directed to a vat where the inoculated final mixture is allowed to ferment to a pH of less than about 4.6. Upon completion of the fermentation, the fermented final product is chilled to a temperature less than about 45° F. and may then be dispensed into suitable containers.

While the concepts of the present disclosure are susceptible to various modifications and alternative forms, specific exemplary embodiments of the disclosure have been shown by way of example in the drawings. It should be understood, however, that there is no intent to limit the concepts of the present disclosure to the particular disclosed forms; the intention is to cover all modifications, equivalents, and alternatives falling within the spirit and scope of the invention as defined by the claims.

The invention claimed is:

1. A non-dairy food product comprising:
    a. a highly dispersible whole grain ingredient, wherein the whole grain ingredient meets the standard of identity for whole grain and disperses in less than about 5 seconds in an aqueous media at 25° C.;
    b. a protein from a source other than the whole grain ingredient;
    c. a fiber from a source other than the whole grain ingredient;
    d. a fat from a source other than the whole grain ingredient; and
    e. water,
    wherein the product is free of exogenous stabilizers.

2. The product of claim 1 further comprising a bran concentrate.

3. The product of claim 1 wherein the whole grain ingredient is oat or barley.

4. The product of claim 3 wherein the whole grain ingredient is soluble whole oat flour, wherein the soluble whole oat flour and the highly dispersible whole grain ingredient are present in the food product such that from about 1 to about 5 grams of β-glucan is present in about 120 to 150 grams of the product.

5. The product of claim 1 wherein at least 8 grams of whole grain is present in about 120 to 150 grams of the product.

6. The product of claim 1 wherein
    the highly dispersible whole grain ingredient is provided by at least partially hydrolyzing starch in a starting whole grain to provide a partially hydrolyzed whole grain ingredient,
    the starting whole grain has a pre-hydrolysis starch-to-protein mass ratio and the hydrolyzed whole grain has a post-hydrolysis starch-to-protein mass ratio, such that the post-hydrolysis starch-to-protein mass ratio is equal to the pre-hydrolysis starch-to-protein mass ratio within a tolerance of ±10% of the pre-hydrolysis starch-to-protein mass ratio.

7. The product of claim 1 wherein the protein is a vegetable protein isolate.

8. The product of claim 7 wherein the vegetable protein isolate is selected from the group consisting of pea, potato, *faba* bean, chickpea, lentil, and combinations thereof.

9. The product of claim 1 wherein at least 5 grams of complete protein according to protein digestibility corrected amino acid score (PDCAAS) is present in about 120 to 150 grams of the product.

10. The product of claim 1 wherein the fiber is provided from an endogenous source or a combination of an endogenous source and an exogenous source.

11. The product of claim 10 wherein the endogenous source is a fruit pomace.

12. The product of claim 11 wherein the fruit pomace is apple pomace.

13. The product of claim 10 wherein the fiber is provided from an endogenous fiber source and an exogenous fiber source.

14. The product of claim 13 wherein the exogenous fiber source is inulin.

15. The product of claim 1 wherein the fat is selected from the group consisting of almond butter, avocado oil, cacao butter, coconut milk, sunflower oil, coconut cream, and combinations thereof.

16. The product of claim 1 further comprising a fermentation agent selected from the group consisting of *Streptococcus* thermophiles, *Lactobacillus* delbruckii subsp. *bulgaricus*, and mixtures thereof.

17. The product of claim 1 wherein at least $1\times10^3$ CFU of the fermentation agent is present in about 120 to 150 grams of the product.

18. The product of claim 1 further comprising an exogenous mono- or disaccharide.

19. The product of claim 1 wherein the product exhibits a viscosity at 10° C. in the range of about 10 cP to about 600 cP.

20. The product of claim 1 wherein the product exhibits a viscosity at 10° C. in the range of about 1,000 cP to about 14,000 cP.

21. A process for preparing a fermented non-dairy food product comprising:
   a. emulsifying a fat in the presence of protein to form a first mixture;
   b. mixing the first mixture with water, at least one of a whole grain ingredient and grain concentrate, and fiber to form a final mixture, wherein the final mixture is free of exogenous stabilizers;
   c. pasteurizing the final mixture and subsequently cooling the pasteurized final mixture to a temperature of about 100° F.;
   d. inoculating the cooled pasteurized final mixture with a fermentation agent;
   e. allowing the final mixture to ferment at a temperature of about 100° F. for a period of time sufficient to achieve a pH of the final mixture to be less than about 4.6;
   f. thereafter, cooling to temperature of less than about 45° F. to terminate the fermentation and to provide a final product.

* * * * *